United States Patent [19]
Saliba

[11] Patent Number: 5,973,872
[45] Date of Patent: Oct. 26, 1999

[54] METHOD AND APPARATUS FOR A LOW COST MULTI-CHANNEL TAPE RECORDING HEAD

[75] Inventor: George Saliba, Northboro, Mass.

[73] Assignee: Quantum Corporation, Milpitas, Calif.

[21] Appl. No.: 08/788,126

[22] Filed: Jan. 23, 1997

[51] Int. Cl.$^6$ .............................. G11B 15/18; G11B 5/09; G11B 5/55

[52] U.S. Cl. .......................... 360/69; 360/53; 360/78.02

[58] Field of Search ........................... 360/31, 53, 77.12, 360/78.02, 69, 18, 19.1, 22, 24, 77.01, 78.01, 75, 106, 55, 61, 62, 63, 64, 122

[56] References Cited

U.S. PATENT DOCUMENTS

| | | | |
|---|---|---|---|
| 5,055,959 | 10/1991 | Saliba | 360/122 |
| 5,262,908 | 11/1993 | Iwamatsu et al. | 360/77.12 |
| 5,371,638 | 12/1994 | Saliba | 360/77.12 |
| 5,426,551 | 6/1995 | Saliba | 360/122 |

*Primary Examiner*—Paul W. Huber
*Attorney, Agent, or Firm*—John C. Chen

[57] ABSTRACT

A method and apparatus for providing low cost multi-channel magnetic tape recording is disclosed. A tape head having the same number of read and write cores as a typical low cost single channel recording head, is modified to achieve multi-channel recording. One channel performs conventional read-after-write while the other channel performs "virtual" read-after-write, that is, the track in the second channel is read only after that track has been written over the entire length of the tape. As the direction of tape travel changes, the channel performing read-after-write alternates.

17 Claims, 7 Drawing Sheets

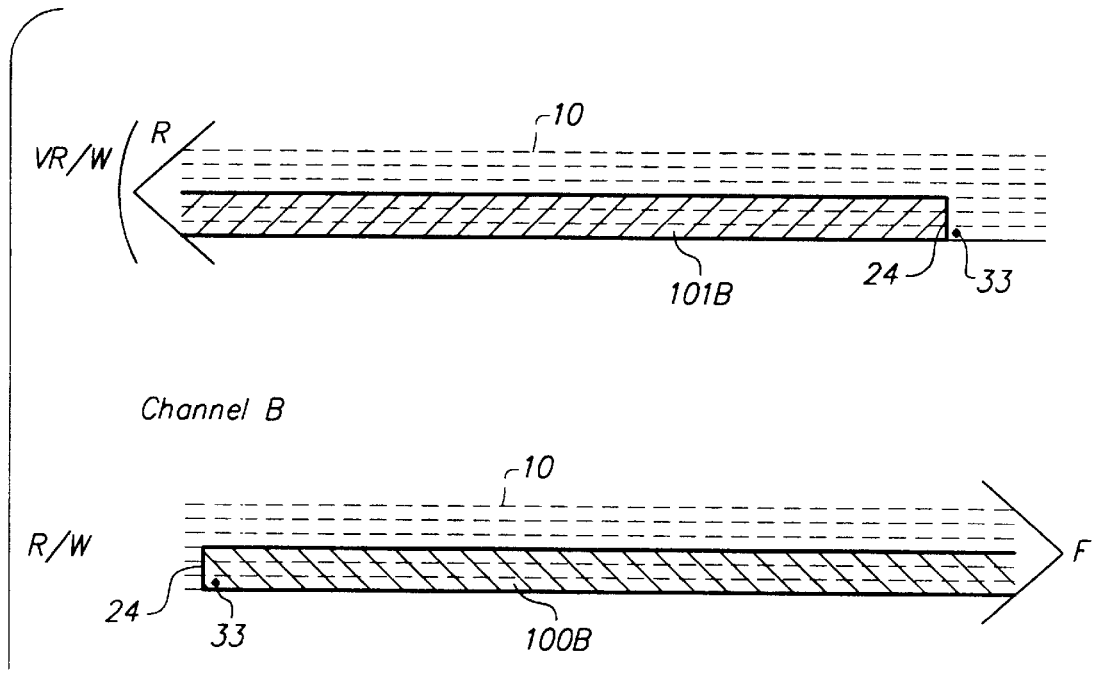
FIG. 4A
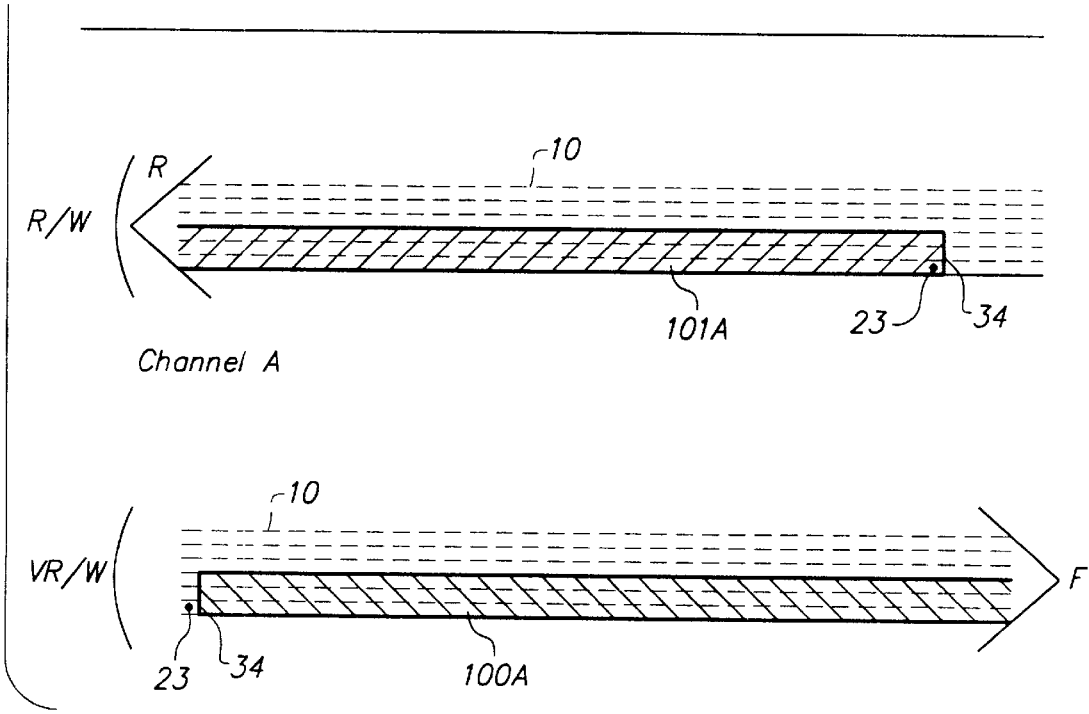

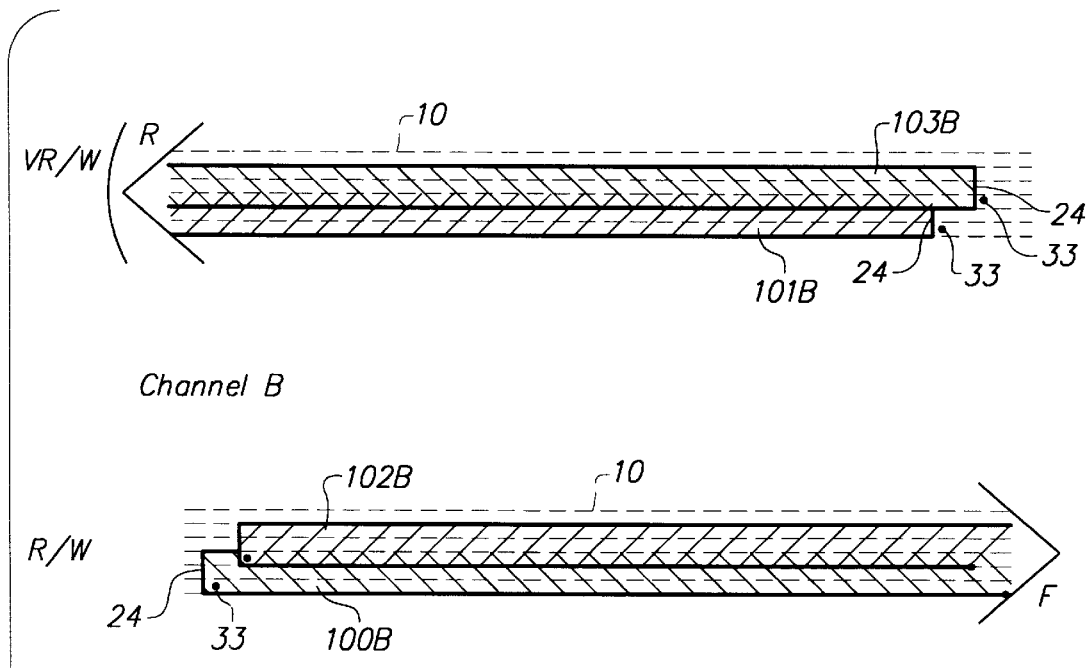
FIG. 4B
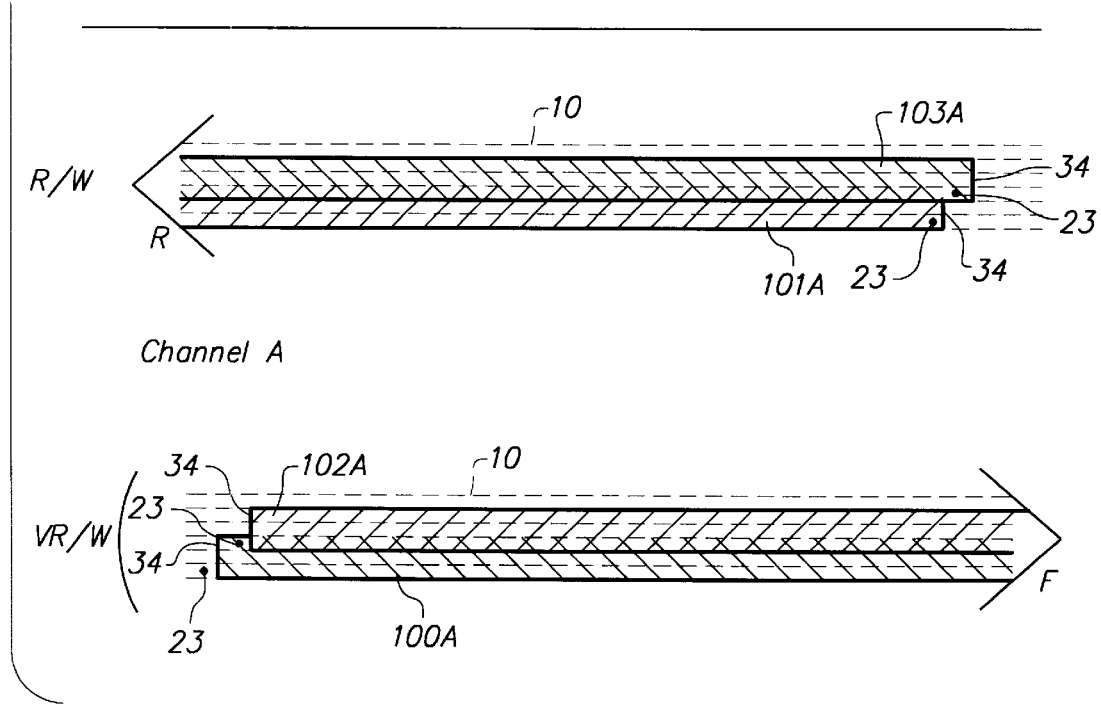

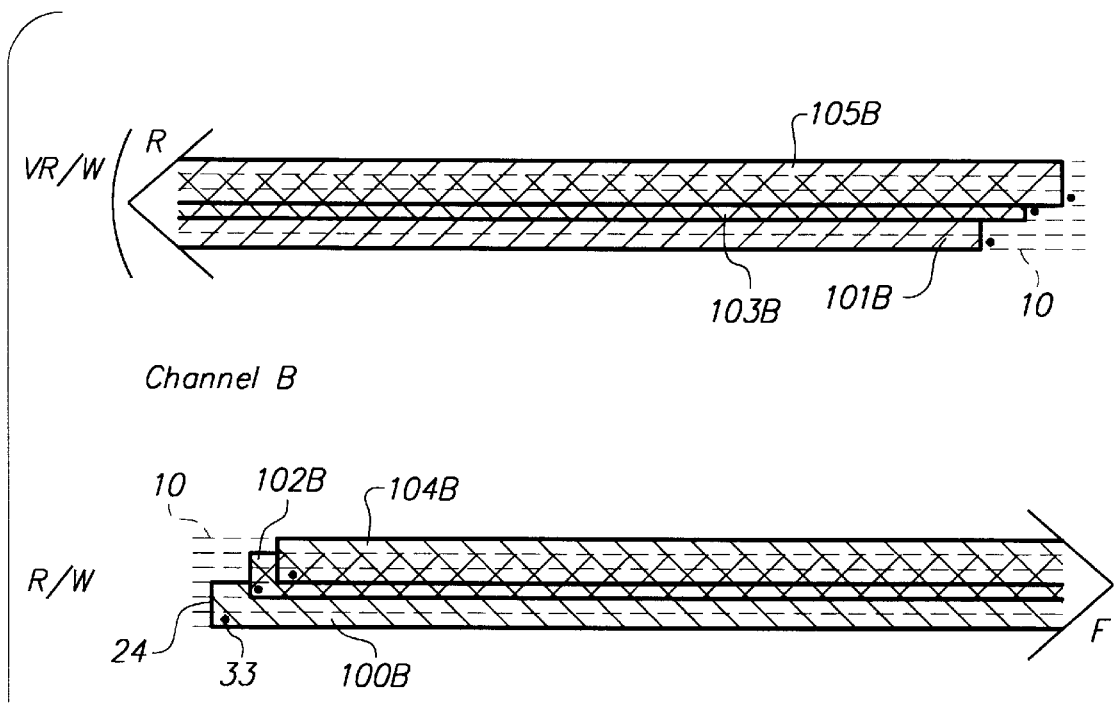
FIG. 4C
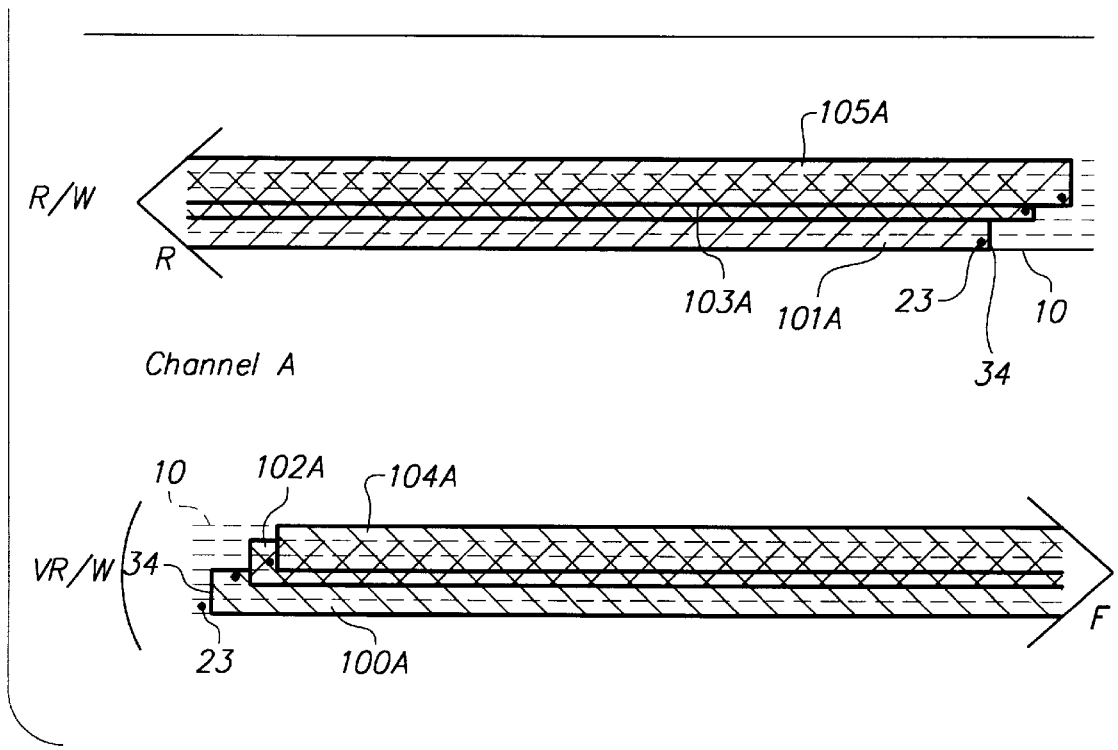

METHOD AND APPARATUS FOR A LOW COST MULTI-CHANNEL TAPE RECORDING HEAD

FIELD OF THE INVENTION

The present invention relates generally to magnetic recording devices and particularly to a method and apparatus for achieving multi-channel recording with a low cost magnetic recording head.

BACKGROUND OF THE INVENTION

The constantly increasing operational speeds of digital computers are creating a demand for corresponding increases in data storage capacities of magnetic tape recording and reproducing systems, while maintaining the special requirements of high speed digital tape systems.

Tape drives use separate read and write cores in order to verify that the data was written correctly to the tape. One method is to verify all written data, as the data is written, and re-write any defective blocks. This method is referred to as "read-after-write". Read-after-write is preferred because of high defect count on tapes and the open environment of tape drives.

Most tape drives operate in a bi-directional mode in order to avoid wasted rewind time. That is, data may be written while the tape travels in either the forward or reverse direction. It is desirable that tape recording and reproducing systems for use as computer data storage devices provide high data transfer rate and perform a read check on all written data. To achieve those goals, tape drives use parallel multiple read/write channels in order to achieve high data transfer rates. FIG. 1a offers a typical single channel head found in tape drives. One set of read and write cores is employed during the forward and reverse direction of tape travel. Thus only one track may be written at a time, in each direction. This head arrangement is inexpensive to manufacture, but not desirable for high data transfer rate recording. FIG. 1b shows a multi-channel head arrangement employing a plurality of read and write cores. This type of design may be applicable for high data transfer rate recording, but it is very expensive to fabricate. An alternative multi-channel head design uses three islands, as illustrated in FIGS. 2a and 2b, wherein the cores of the middle island are shared by the cores in the outer island. The disadvantages of such prior art multi-channel head designs are the price and cost. Head cost is the largest contributor to the cost of tape drives. Specifically, the large number of cores and island complexity coupled with low manufacturing yields and high labor content keep the head cost very high. On the other hand, single channel tape drives are less expensive to manufacture. However, such low end tape drives have been unable to keep pace with the ever increasing demand for high performance.

Thus, a hitherto unsolved need has remained for a low cost multi-channel recording head suitable for precise high data transfer rate recording.

SUMMARY OF THE INVENTION

The present invention provides multi-channel magnetic tape recording by modifying a head typically employed for low cost single channel recording. The modified head includes two parallel islands, each containing a read core and a write core. The cores are arranged to provide two channel recording. The length of the write cores are approximately three times the track width while the read cores are approximately 0.5 to 0.75 times the track width. This arrangement enables a recording method wherein two tracks are written while the tape travels in one direction, wherein one track performs the conventional read-after-write operation, while the other channel performs "virtual" read-after-write, that is, the other track is read only after that track has been written on the entire length of the tape. Accordingly, each channel performs conventional read-after-write on alternating tracks, after each change in direction of tape travel.

BRIEF DESCRIPTION OF THE DRAWINGS

FIGS. 4a, 4b and 4c are schematic representations of a segment of a tape showing the process of writing data on tracks in accordance with principles of the present invention.

DETAILED DESCRIPTION OF THE PREFERRED EMBODIMENT

The present invention is directed toward a low cost multi-channel magnetic head which is suitable for high density tape recording.

Figure 5:
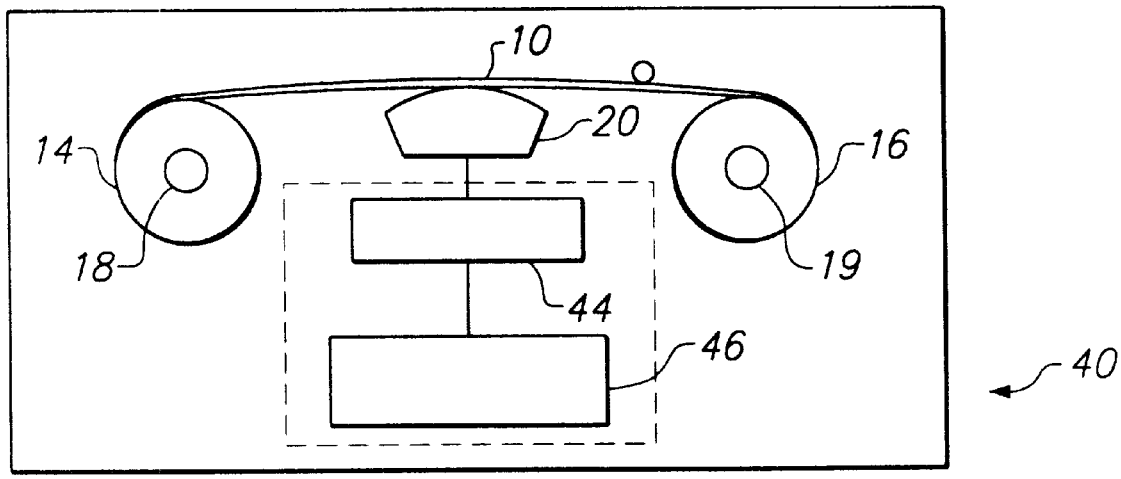
FIG. 5 is a schematic representation of a magnetic tape system is accordance with principles of the present invention.

FIG. 5 shows a magnetic tape system 40 for longitudinal recording at very high track densities on a magnetic tape 10. The tape reels 14 and 16 are mounted on a rotatably driven reel drive motors 18 and 19. The reel drive motors 18 and 19 rotate reels 14 and 16 to move tape 10 in a forward direction from the reel 14 to the take-up reel 16. As the tape 10 advances, it moves across the magnetic head 20, which writes longitudinal tracks of data onto the tape 10. The magnetic head 20 contains separate read and write cores, enabling read verify of written data. When the entire length of the tape 10 has been transferred from tape reel 14 to reel 16, the direction of rotation of the reel drive motors 18 and 19 are reversed. The tape 10 now advances across the magnetic head 20 in the reverse direction. As the tape 10 begins to advance in the reverse direction, the magnetic head 20 is stepped in a lateral direction across the tape 10 by the magnetic head assembly 44, enabling the recording of another track of information on the tape 10 A controller 46 provides data to be written by the magnetic head 20, accepts read data from the magnetic head 20, and provides control information to the magnetic head assembly 44. The advancement of the tape 10 continues in forward and reverse directions with the magnetic head 20 stepped laterally across the tape 10, resulting in multiple parallel recorded tracks.

Figure 1A:
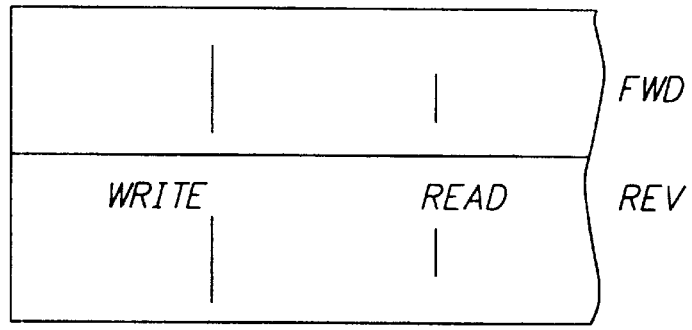
FIG. 1a is a representation of a prior art single channel tape head.
Figure 1B:
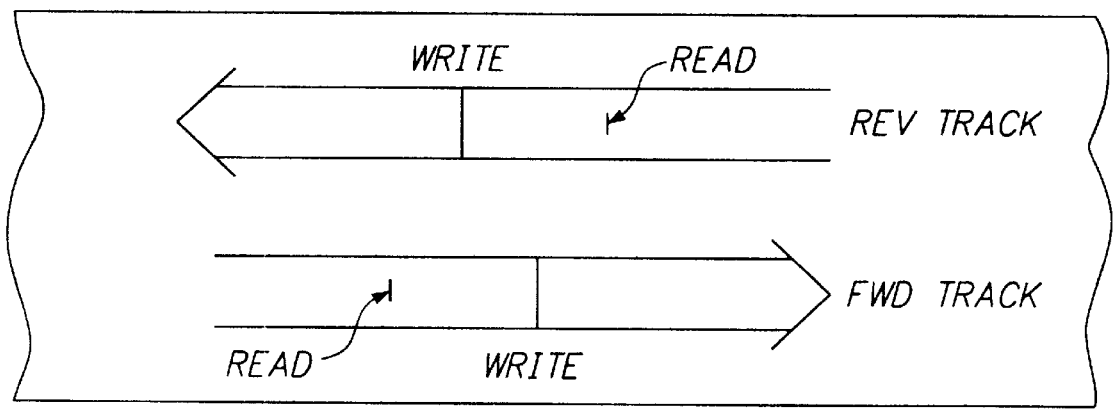
FIG. 1b is a representation of a prior art multi-channel tape head.
Figure 1C:
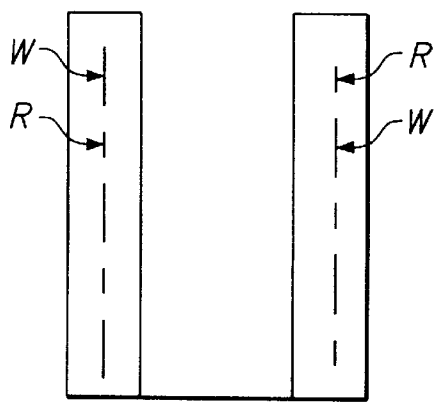
Figure 2A:
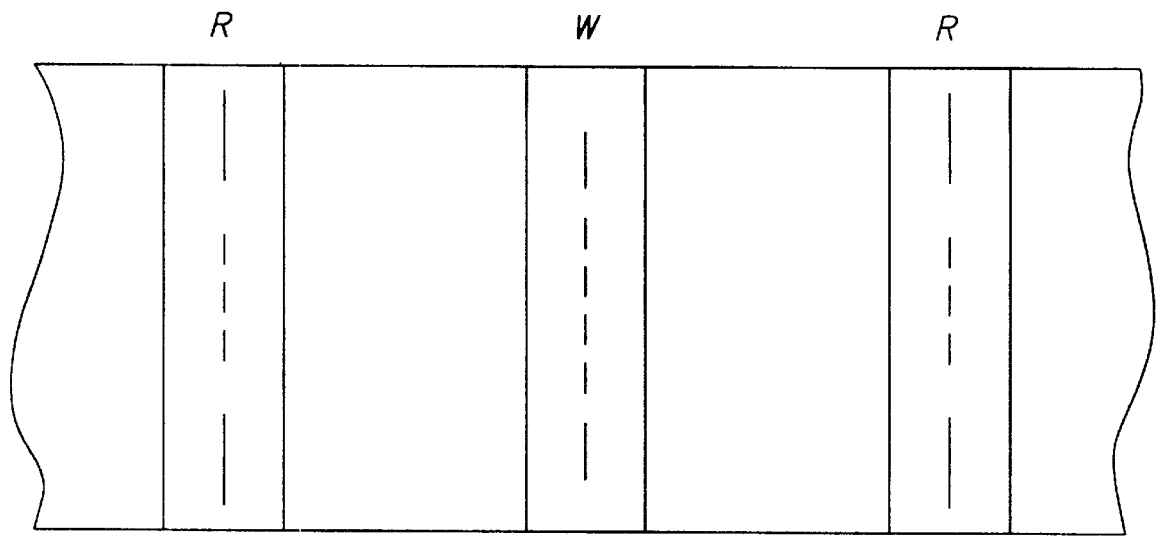
FIGS. 2a and 2b are representations of other prior art multi-channel tape heads.
Figure 2B:
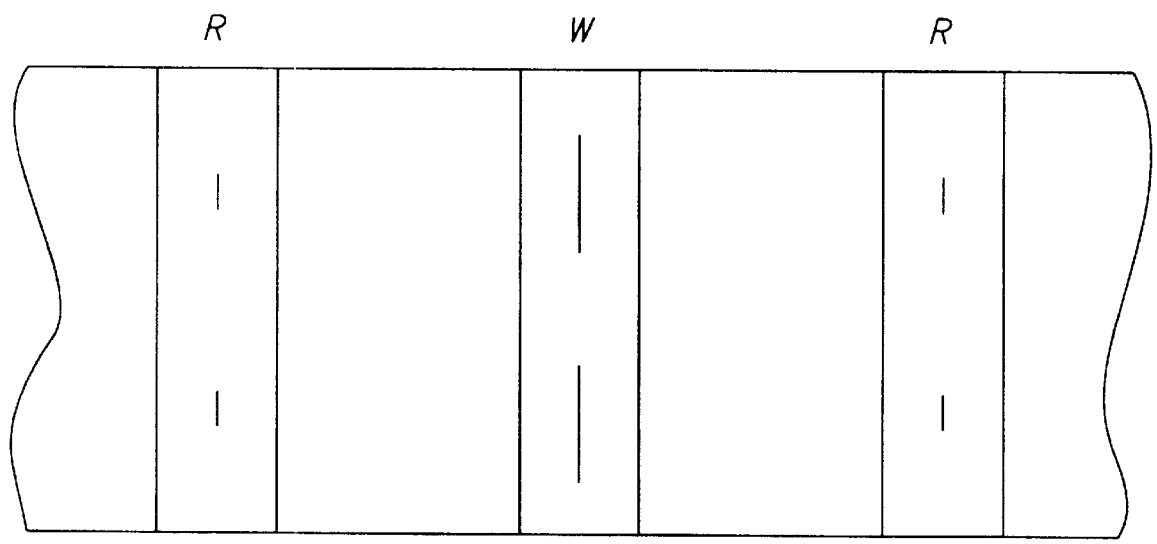
Figure 3A:
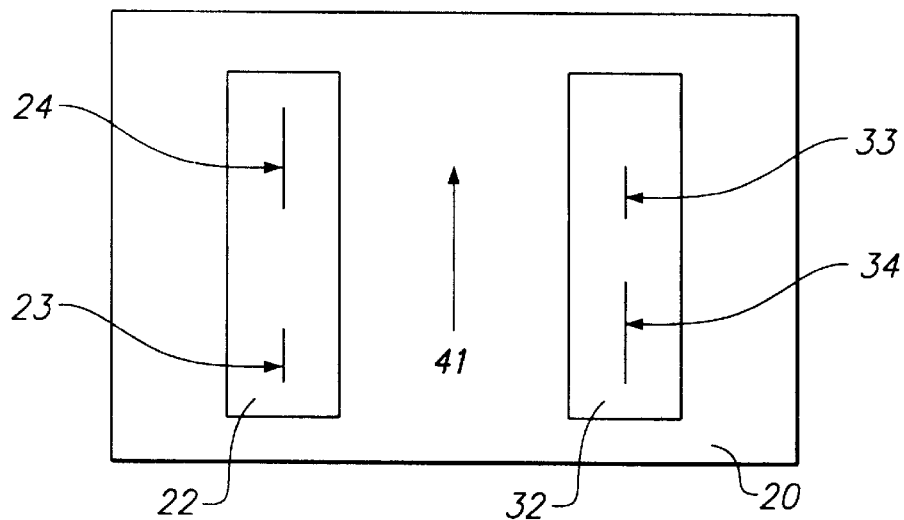
FIGS. 3a and 3b are a representation of a multi-channel head in accordance with principles of the present invention.

Referring now to FIG. 3a, a surface of the multi-channel magnetic head 20 according to the present invention, is shown. The surface of the tape head 20 includes two islands 22 and 32. The first island 22 contains write core 24 and read core 23 while the second island 32 contains write, core 34 and read core 33. The cores of each island are arranged such that their lengths extend in a lengthwise direction generally parallel to the direction of arrow 41, as shown in FIG. 3a. Read cores 23 and 33 are defined diagonally adjacent each other. Likewise for write cores 24 and 34. As will be explained herein below, this arrangement of read and write cores enables conventional read-after-write method of recording in one channel, and a "virtual" read-after-write method in the other channel, while the tape travels in one direction. As mentioned hereinabove, virtual read-after-write method verifies the information written on a channel only after the entire length of the tape has been written.

Figure 3B:
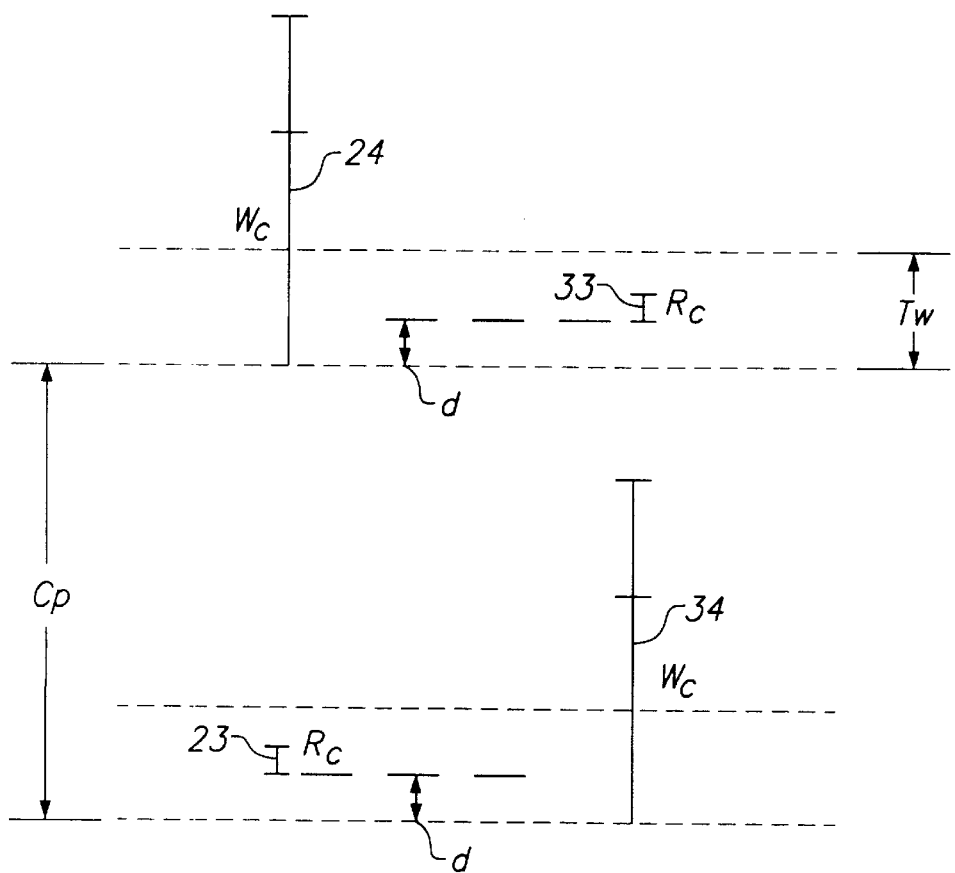

FIG. 3b provides a detailed illustration of the dimensional relationship of the read and write cores of the present invention. As illustrated in the embodiment of FIG. 3b, write cores 24 and 34 and read cores 23 and 33 are arranged such that read core 33 is laterally offset from write core 24 by a distance d. Likewise, read core 23 is also laterally offset from write core 34 by the same distance d. This offset compensates for any lateral tape movement and ensures that in each channel, read cores 23 and 33 will read not read incorrect data. The length of the write cores 24 and 34, represented by Wc, is approximately three times the desired track width, Tw, while the length of the read core, represented by Rc, is approximately 0.5 to 0.75 times smaller than the desired track width, Tw. With this arrangement, read core 22 and write core 32 define a first channel while read core 33 and write core 24 define a second channel. Each channel is approximately three times the desired track width and is written simultaneously. Of course different dimensions can be employed for operation in different magnetic media environments, the dimensions herein given by reason of example only.

In one embodiment provided for operation with a standard 0.5 inch magnetic tape, laterally spaced apart longitudinal write cores 24 and 34 of islands 22 and 23 have a length Wc=20 micro inches. The read cores 23 and 33 of islands 22 and 32, respectively, have a length Rc=3 micro inches.

Figure 6:
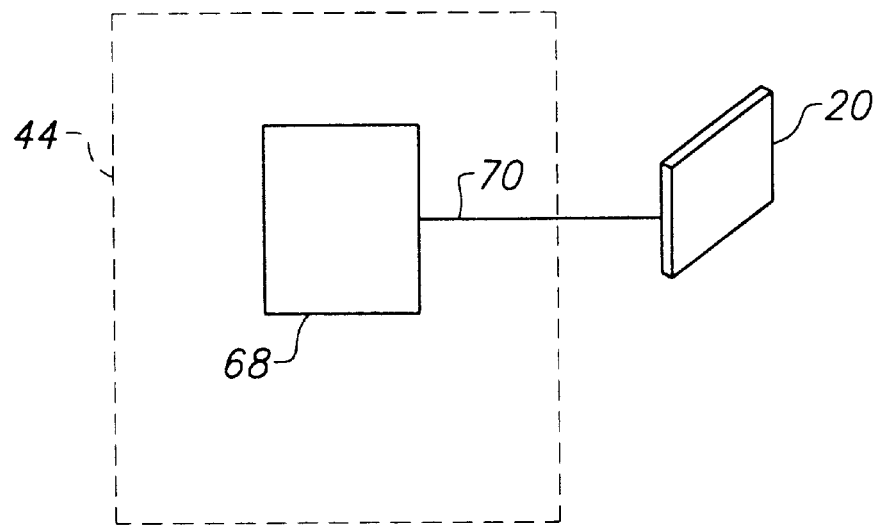
FIG. 6 is a more detailed schematic representation of the head assembly of FIG. 5.

Referring now to FIG. 6, magnetic head 20 is shown mounted on the head assembly 44. Head assembly 44 includes an actuator 70 and a stepper motor 68. As shown, the magnetic head 20 is mounted for lateral movement about the actuator 70. Stepper motor 68, which receives input from controller 46, serves to engage the actuator 70, shown as a linear actuator in FIG. 6, for moving the magnetic head 20 in a lateral or widthwise direction across the tape 10. The stepper motor 68 and the linear actuator 70 are also used to adjust the track to track position of magnetic head 20. Thus, as tape 10 reaches the end in one direction, stepper motor 68 and actuator 70 laterally indexes magnetic head 20 from one track to the next.

FIGS. 4a–4c illustrate the progression of tracks being written on two channels of the tape 10 in accordance with principles of the present invention. For illustration purposes, the channels are represented by A and B. In FIGS. 4a–4c, each written track is identified by forward and backward slash marks. The slash marks are merely meant to aid the reader in distinguishing separate written tracks. The slash marks are in no way representative of the actual recording patterns. As shown in FIG. 4a, initial tracks 100A and 100B are written in channels A and B, respectively, as tape 10 travels in the forward direction, as indicated by arrow F. With the arrangement of the cores, track 100B is written with the conventional read-after-write operation. As shown, read core 33 is able to check and verify the integrity of data from track 100B, as it is written by write core 24. This conventional method enables data to be re-written should the read core 33 encounter a defective block on track 100B. On the other hand, read core 23 is not in position to verify the integrity of data on track 100A as it is written by write core 34. As will be explained hereinbelow, data written on track 100A may be verified only after the entire length of the tape 10 has been written.

Once tape 10 reaches the end in the forward direction F, stepper motor 68 laterally indexes magnetic head 20 to a second lateral position of tape 10 to write tracks 101A and 101B in the reverse direction R, shown in FIG. 4a. As the tape 10 travels in the reverse direction R, track 101A is written with read-after-write operation by read core 23 and write core 34 while data in track 101B is written by write core 24. Again, read core 33 "trails" write core 24 when the tape travels in the reverse direction R, so that read-after-write is not performed on track 101B.

Once tape 10 reaches the end in the reverse direction R, stepper motor 68 again laterally indexes the head 20 to the next lateral position on tape 10 to write tracks 102A and 102B in the forward direction F, as illustrated in FIG. 4b. As shown, write core 34 and read core 23 are positioned so that track 102A is written laterally overlapping the previously written track, i.e. track 100A, by one track width. As write core 34 records data onto track 102A, read core 23 is in position to read and verify the integrity of data of previously written track 100A. Since data in track 100A is verified only after the entire track has been written, this, again, is referred to as "virtual" read-after-write. In a manner similar to conventional read-after-write, any portion of track 100A being detected by read core 23 as containing a defective block may be re-written. The difference being that track 100A is read and verified while track 102A is written. On the other hand, write core 24 and read core 33 are positioned so that track 102B is similarly written partially overlapping the previously written track 100B. Track 102B is written under the same conventional read-after-write operation as track 100B.

Upon reaching the end of the tape, the stepper motor 68 again laterally indexes magnetic head 20 to a third lateral position on tape 10 to write tracks 103A and 103B in the reverse direction R. In this third lateral position, the head 20 is positioned so that track 103A may be written partially overlapping previously written track 101A while track 103B may be written partially overlapping previously written track 101B. In this direction, the opposite of the forward direction occurs. That is, conventional read-after-write is performed in channel A, while virtual read-after-write is performed in channel B. Thus, in channel A, data in track 103A is read and verified by read core 23 while track 103A is written by write core 34. In channel B, data in track 101B is read and verified by core 33 while track 103B is written by write core 24.

Similarly, after reaching the end of the tape in the reverse direction, magnetic head 20 is indexed to the next lateral position to write tracks 104A and 104B in the forward direction, as illustrated in FIG. 4c. Again, tracks 104A and 104B partially overwrite tracks 102A and 102B, to enable virtual read-after-write. In the forward direction, conventional read-after-write is performed in channel B while virtual read-after-write is performed in channel A. In the reverse direction, after the head 20 is indexed to the next lateral position, tracks 105A and 105B partially overwrite tracks 103A and 103B, respectively, and conventional read-after-write is performed in channel A.

As seen, the present invention enables two channel recording using a low cost head by alternating conventional read-after-write operation in one channel with a virtual read-after-write operation in the other. As the direction of tape travel changes, the channel employing read-after-write changes as well.

It should be noted that the invention described herein above, is operable based on the assumptions that tape defects are not substantially altered by the write function and that tape drives are sequential devices, that is, only data adding (appending) is permitted.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A method of multi-channel longitudinal recording on a magnetic medium with a multi-channel head, the method comprising the steps of:

writing data at a first lateral position of a first channel on the magnetic medium as the magnetic medium travels in a first direction;

reading data from the first lateral position of the first channel as data is being written at the first lateral position;

writing data at a first lateral position of a second channel on the magnetic medium as the magnetic medium travels in the first direction; and reading data from the first lateral position of the second channel as the magnetic medium travels in a first direction, after the magnetic medium has been written in the first direction.

2. The method of claim 1 further comprising the steps of:

writing data at a first lateral position of the first channel as the magnetic medium travels in the second direction;

reading data written at the first lateral position of the first channel as the magnetic medium travels in the second direction, after the magnetic medium has been written in the second direction;

writing data at a first lateral position of the second channel as the magnetic medium travels in the second direction; and reading data from the first lateral position of the second channel as data is being written at the second lateral position.

3. The method of claim 1 wherein data in the first channel is written by a first write core and read by a first read core, the first read core and first write core being defined in a longitudinally parallel relationship on the multi-channel head.

4. The method of claim 2 wherein data in the second channel is written by a second write core and read by a second read core, the second read core being defined in a longitudinally parallel relationship with the second write core on the multi-channel head.

5. The method of claim 2 wherein data written in the first and second channel each define a longitudinal track.

6. The method of claim 5 wherein a portion of a width of the track written at the second lateral position of the first channel laterally overlaps a portion of the track written at the first lateral position of the first channel.

7. The method of claim 6 wherein a portion of a width of the track written at the second lateral position of the second channel overlaps a lateral portion of the track written at the first lateral position of the second channel.

8. The method of claim 5 wherein longitudinal tracks in the first channel are written in parallel relationship with longitudinal tracks in the second channel.

9. The method of claim 1 wherein data written at the first lateral position of the second channel, in the first direction, is read while data is written to a second lateral position of the second channel, as the magnetic medium travels in the first direction.

10. The method of claim 2 wherein data written at the first lateral position of the first channel, in the second direction, is read while data is written to a second lateral position of the first channel, as the magnetic medium travels in the second direction.

11. An apparatus for multi-channel recording on a magnetic medium comprising:

a first write core defined on a surface of a magnetic head for writing longitudinal tracks of data in a first channel, the first write core being further defined perpendicular to a first and second direction of magnetic medium travel;

a first read core defined on the surface of the magnetic head for reading longitudinal tracks of data written in the first channel, the first read core being longitudinally offset from the first write core, in the direction parallel with the direction of magnetic medium travel;

the first read and write cores being defined such that each longitudinal track written as the magnetic medium travels in the first direction is subsequently read as the magnetic medium travels in the first direction;

a second write core defined on the surface of the magnetic head for writing longitudinal tracks of data in a second channels the second write core being laterally offset from the first read cores in the direction perpendicular to the direction of magnetic medium travel;

a second read core defined on the surface of the magnetic head for reading longitudinal tracks of data written in the second channel, the second read core being longitudinally offset from the second write core; and the second read and write cores being defined such that each longitudinal track written as the magnetic medium travels in the first direction is read as the magnetic medium travels in the first direction, during writing of a next subsequent longitudinal track.

12. The apparatus of claim 11 wherein the first write core is approximately three times larger than the first read core.

13. The apparatus of claim 11 wherein the second write core is approximately three times larger than the second read core.

14. The apparatus of claim 11 wherein the first and second read cores are further defined in diagonal relation to each other.

15. The apparatus of claim 11 wherein the first and second write cores are further defined in diagonal relation to each other.

16. The apparatus of claim 11 wherein each longitudinal track of data written in the second channel while the magnetic medium travels in the second direction, is subsequently read by the second read core as the magnetic medium travels in the second direction.

17. The apparatus of claim 16 wherein each longitudinal track of data written in the first channel, while the magnetic medium travels in the second direction, is subsequently read by the first read core as the magnetic medium travels in the first direction, during writing of the next subsequent longitudinal track of data.

* * * * *